Sept. 15, 1970     W. E. ENGELHARD     3,529,219
CIRCUIT CONTROL INSTRUMENT WHERE ONE
TRANSMITTER FOLLOWS ANOTHER
Filed June 14, 1968     2 Sheets-Sheet 1
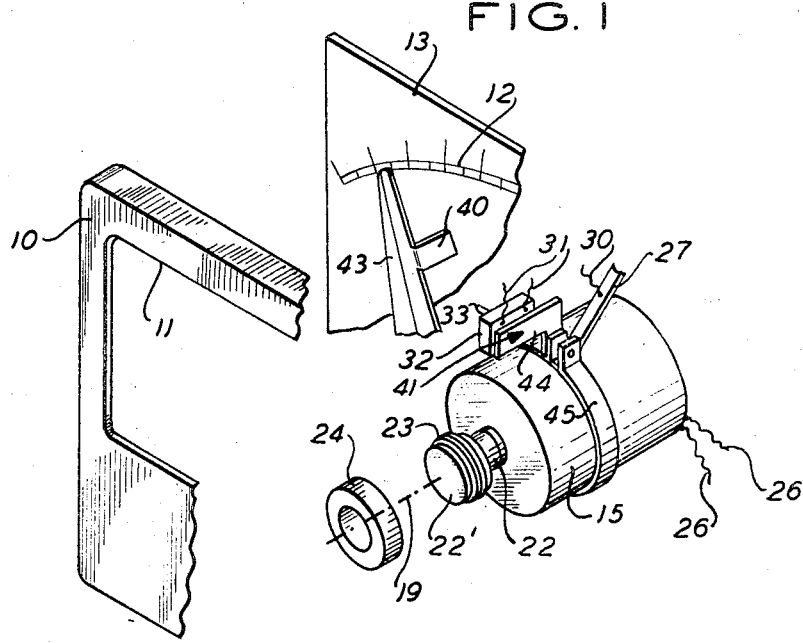
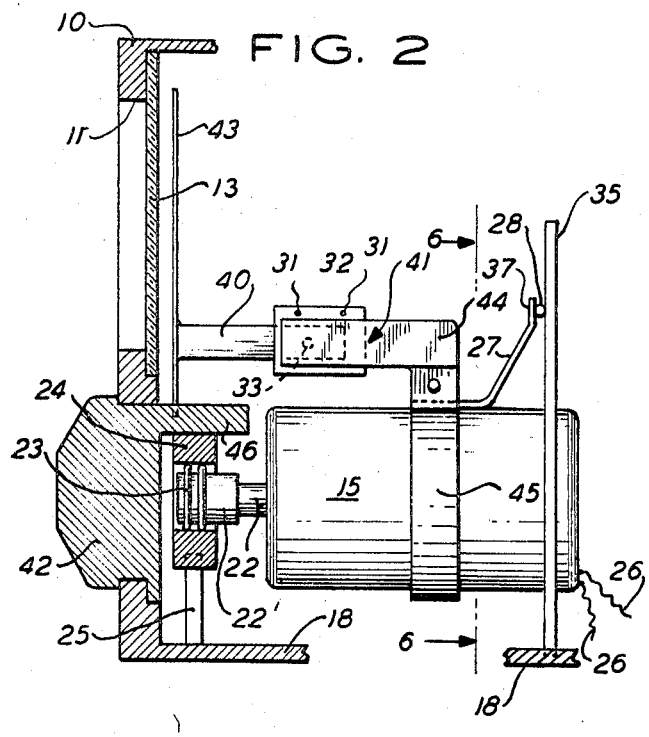
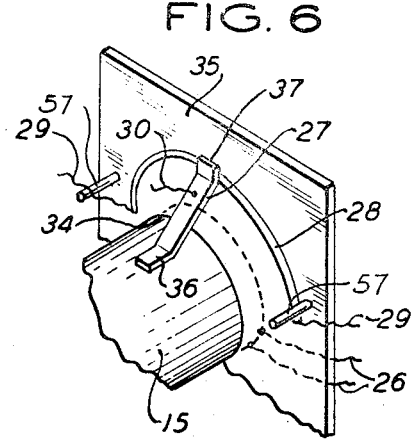
INVENTOR
W. E. ENGELHARD
BY
*Sommers & Sommers*
ATTORNEYS Sept. 15, 1970 W. E. ENGELHARD 3,529,219
CIRCUIT CONTROL INSTRUMENT WHERE ONE
TRANSMITTER FOLLOWS ANOTHER
Filed June 14, 1968 2 Sheets-Sheet 2
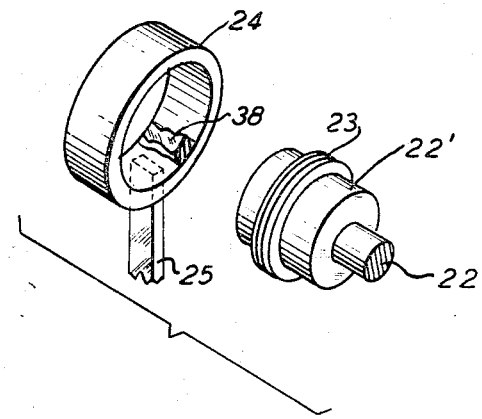
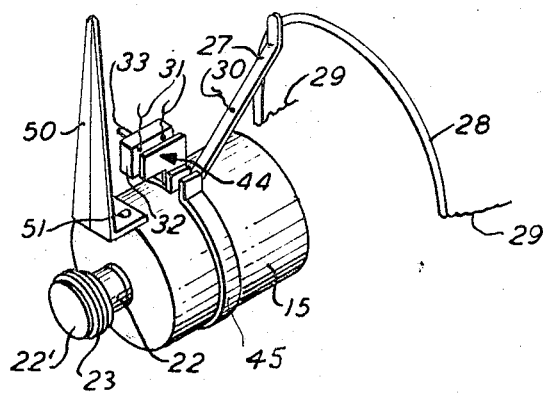
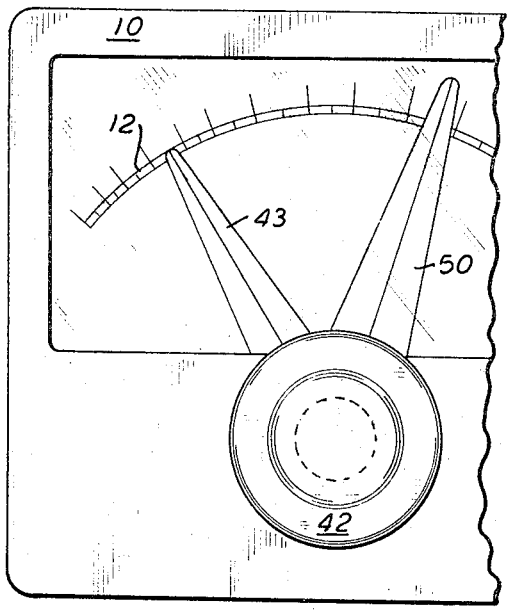
*INVENTOR*
W. E. ENGELHARD
BY
*Sommers & Sommers*
ATTORNEYS United States Patent Office 3,529,219
Patented Sept. 15, 1970

3,529,219
CIRCUIT CONTROL INSTRUMENT WHERE ONE TRANSMITTER FOLLOWS ANOTHER
William E. Engelhard, Apalachin, N.Y., assignor to Pyro-Serv Instruments, Inc., North Arlington, N.J., a corporation of New Jersey
Filed June 14, 1968, Ser. No. 737,067
Int. Cl. G05b *11/16*
U.S. Cl. 318—675                4 Claims

ABSTRACT OF THE DISCLOSURE

An instrument having a motor housing rotatably mounted therein for the control of furnaces, cryogenic equipment or other apparatus, on actuation of a switch member, on rotation of the motor housing, the armature (output) shaft being held stationary, thereby moving a second switch element, carried by the motor casing, into actuating registry with the first switch member, the latter being secured to a control shaft or knob, set by user to a point on the instrument scale at which it is desired that the circuit controlled by the instrument shall thus be opened or closed.

---

This invention relates to a compact instrument for the control of a circuit on registration of switch elements at a preset actuation point on a scale of the instrument. The instrument may utilize electronic amplification of error signal to power an A.C. or D.C. servo motor positioning a slidewire contact to the null-point of a bridge or potentiometer, wherein the motor housing is rotatably mounted on a bearing while the output shaft is held stationary. Heretofore in such instruments, the motor housing has been held stationary and its rotating output shaft connected to a slidewire contact (or slidewire) and indicating pointer, by such means such as gears, pulleys and cables, or levers, thus increasing the possibility of error due to play, misalignment, difficulty of adjustment, friction and the like.

The foregoing and other disadvantages of prior practices are overcome in the construction of this invention which provides inherent simplicity and reliability and accuracy of operation.

The invention may be used for example, for sensing elevation of temperatlure of a furnace of cryogenic or other scale measuring, indicating or recording instrument, for control of a scale measuring or recording from a thermal, linear or other source to a predetermined point. A control knob of the instrument is preset to actuate a control switch or control unit. Where such unit is used for a furnace, for example, the oven temperature sensor may be connected with an amplifier, which in turn may be connected with a servo motor having a switch actuated on the attainment of the temperature for which the instrument is preset so as to control the circuit for the oven.

Pursuant to the invention, a small potentiometer controller and servo motor may be provided, as disclosed herein, the servo motor being operated and balanced as would be the conventional large motors used for the purpose. The motor armature shaft is held against rotation and the motor barrel or casing allowed to rotate, needing only a short arc. The device is efficient and practical in operation, and economical to manufacture and operate, and may be mounted in a small space—in a small panel meter case, for example.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is a fragmentary, schematic, isometric view of a circuit control instrument embodying the invention, FIG. 2 is a vertical elevational, partly sectional view thereof, FIG. 3 is an exploded, perspective, partly fragmentary view of parts thereof, FIG. 4 is a fragmentary isometric view of parts thereof, FIG. 5 is a fragmentary front elevational view of an instrument embodying a form of the invention, and FIG. 6 is a fragmentary, perspective view, taken at line 6—6 of FIG. 2.

As shown in the drawings, the circuit control instrument of the invention is mounted in a suitable instrument casing 10 having an opening 11 in the front wall thereof for viewing therethrough of the scale 12 on a panel 13.

Pursuant to the invention, the instrument is provided with a motor casing or barrel 15 rotatably mounted in the instrument as in a suitable bearing aperture 34 in the slide wire board 35. The extended end 22' of the armature of the motor serves the further function of mounting an end of the motor in the bearing 24, a second motor mounting being provided by aperture 34 in the S-wire board or plate or rear bearing panel 35; the apertured portion of the board 35, or the motor, or both, may be provided with suitable anti-friction means if desired, the motor, in any case, being so mounted that the casing 15 will be freely rotatable pursuant to the invention. The wiper arm 27 is fixed at one end (36, FIG. 6) to the motor casing 15, the other free end 37 thereof pressing against the slidewire 28. The latter is mounted on the wireboard 35 which is fixed in the casing 10 in any suitable manner, for example as shown in FIG. 2. The wiper arm 27 is preferably of rigid or spring material so that the free end thereof will not only wipe the wire 28 in frictional engagement therewith, but, by virtue thereof, will also serve to keep the motor in proper axial, aligned position in the aperture 34.

Normally slide wire contacts operate on the circumference (inner or outer) and so no thrust is provided axially, but pursuant to my invention the wiper arm 27 and slide wire position against or on inner face of rear bearing panel 35 to supply an axial thrust to the assembly in the present invention, thus keeping the rotating motor assembly firmly aligned axially and positioned in the friction means (forwardly). This also avoids the loading of bearings caused by radial thrust of circumferentially mounted slidewires.

The outer casing or barrel 15 of the motor is the bearing surface (FIG. 6) so no extension with increased panel depth is required.

Friction means is necessary to limit motor torque if scale values are exceeded and to limit shock occurring when the motor casing 15 or a part fixed thereto slams against stops which may be provided at its ends of travel.

A portion 22 of the motor armature extends relatively freely through and out of the motor casing or barrel 15 and has fixed thereto or to an enlarged end 22' thereof (FIG. 4) friction means, as for example, O-rings 23, proportioned to be snugly received (FIG. 2) in a bearing or stud 24 fixed as at 25 to casing 10, to thereby normally frictionally hold the motor shaft 22 against rotation and also serving to insulate the motor from knob 42 and instrument casing 10. The bearing 24 may be made of dielectric material or internally lined with insulating sleeve or liner shown fragmentarily at 38 in FIG. 3, or with an O-ring, to electrically insulate the motor from the control knob 42 and instrument casing 10.

Friction means are necessary to limit motor torque if scale values are exceeded and to limit shock occurring when a member such as wiper arm 27, secured to motor casing 15 slams against stops which may be provided at the ends of travel. For example, stops 57 may be secured to and extend from the slide wire board 35 so that any tendency of the motor casing 15 to override would result in slight rotation of the armature shaft 22 beyond or against the resistance effect of the anti-rotation rings 23.

The torque limiting means may include the lining of the bearing 24 with an electrical insulation liner 38 (FIG. 3) wherein O-rings 23 are enclosed and electrically insulated. If desired instead of or in addition to the insulation liner, the bearing 24 may be made of dielectric material and/or the O-rings 23 may be of dielectric material. The O-rings 23 swell to take up any wear and thus, until completely worn, will continue to be effective, functional and centered.

On signal actuation of the motor, the armature shaft 22 will be frictionally held stationary; the motor barrel or casing 15 will be rotated within a limited arc. Thus not much motion and wear will be imparted to the parts in actual use pursuant to the invention. Actuation of the motor 25 is achieved proportional to the pickup control signal, as by wires 26 going through an amplifier, thermocouple or other instrument in the furnace of other source of electrical apparatus to be controlled pursuant to the invention.

A wiper arm 27, secured as (FIGS. 1 and 2) at 45 to the motor barrel 15, wipes the potentiometer circuit wire 28 connected by wires 29 with the potentiometer network. Wiper 27 has signal pickup wire 30 secured thereto for connection with the plus of the thermocouple. Wires 31 connect the microswitch 32 with the controls of the furnace or other equipment to be controlled.

Pursuant to the invention, first and second switch elements 40, 41 are provided (FIGS. 2 and 4) such that the control shaft or knob 42 for the instrument may be set to thereby set a first switch member for actuation of the switch so that rotation of casing or barrel 15 will move one of the switch elements, such as 41, having the microswitch 32, into registry with the first switch element (40). Control knob 42 may be moved manually or by motor or other automatic means to "set" it relative to the scale as desired by the user or for the purpose intended.

Pursuant to the invention, the control knob 42 may have a setting pointer 43 thereon or fixed thereto. (FIGS. 2 and 5) or to an arcuate ledge 46 thereof (FIG. 2) to which the first switch element 40 may be suitably secured or said switch element may be mounted directly on knob 42. The second switch element 41 (having microswitch 32) may be in the form of a bracket or plate 44 secured to the motor barrel 15 or to any suitable or desired bracket 45 secured thereto. Microswitch 32 may have an actuator button 33 (FIG. 2) which would be contacted by the first switch element 40 on registration therewith (as below described) to open or close the circuit to be controlled by the instrument on actuation of switch 32. Thus the furnace heating (or cooling) circuit, for example, will continue closed (or open) until registration of the first and second switch elements 40, 41.

The control knob 42, as above described, is turned or preset to register with that particular point of scale 12 at which it is desired to actuate the switch and thereby open (or close) the circuit controlled by the instrument. If desired, a second pointer 50, may (FIG. 4) be secured to the motor casing or barrel 15 for rotation therewith to provide a visual indication of the condition of the circuit controlled by the instrument, and also the progression of the circuit toward the opening or closing point. Said second switch element pointer 50 may be secured by any suitable means 51 (FIG. 4) to motor casing 15.

While the foregoing disclosure of exemplary embodiments is made in accordance with the Patent Statutes, it is to be understood that the invention is not limited thereto or thereby, the inventive scope being defined in the appended claims.

I claim:

1. In a compact instrument for control of a circuit, said instrument having a scale and further having a motor provided with a field in a casing, and a motor armature rotatably disposed in the casing medially of the field with an end of said armature extending out of the casing, means for holding the motor armature against rotation and for rotatably suspending the motor casing in said instrument for rotation relative to the so-held armature on actuation of the motor, complementary switch means on the motor casing and in the instrument for inter-engagment when the casing is rotated to a predetermined point on said scale, to thereby control said circuit, said means for so holding the armature shaft, including a bearing immovably positioned in said instrument for reception of said end of the armature shaft and anti-friction means intermediate the armature shaft and the bearing, normally holding the shaft against rotation, but permitting slight rotation thereof after inter-engagement of the switch means.

2. In a compact instrument as set forth in claim 1, said anti-friction means intermediate the end of the armature shaft and bearing comprising anti-rotation rings.

3. In a compact instrument as set forth in claim 1, said means for so rotatably suspending the motor casing for rotation relative to the so-held armature shaft on actuation of the motor including a plate secured to the casing and provided with an aperture wherein the motor casing is so rotatably suspended.

4. In a compact instrument as set forth in claim 3, a wiper arm fixed at one end to the motor casing and having a free end bearing against said plate, to urge the extending end of the armature shaft to position in said bearing and the motor casing in position in said plate aperture.

References Cited

UNITED STATES PATENTS

| | | | |
|---|---|---|---|
| 1,798,592 | 3/1931 | Davis | 318—31 |
| 2,475,269 | 7/1949 | Yardeny | 318—31 |
| 3,114,089 | 12/1963 | Mulligan | 318—31 |
| 3,221,252 | 11/1965 | Ehrich | 318—31 X |
| 3,274,491 | 9/1966 | Mulligan et al. | 318—31 X |
| 3,283,232 | 11/1966 | Ditto | 318—31 |

THOMAS E. LYNCH, Primary Examiner